United States Patent [19]
Webber et al.

[11] Patent Number: 5,349,870
[45] Date of Patent: Sep. 27, 1994

[54] METHOD AND APPARATUS FOR DETECTING STRESS IN AN OBJECT

[75] Inventors: Martin J. Webber, Beckenham; Gordon R. Hopkinson, Bromley, both of Great Britain

[73] Assignee: Sira Limited, Chislehurst, United Kingdom

[21] Appl. No.: 835,941

[22] PCT Filed: Jun. 26, 1990

[86] PCT No.: PCT/GB90/00988
§ 371 Date: Feb. 21, 1992
§ 102(e) Date: Feb. 21, 1992

[87] PCT Pub. No.: WO91/00504
PCT Pub. Date: Jan. 10, 1991

[30] Foreign Application Priority Data
Jul. 3, 1989 [GB] United Kingdom ............... 8915227

[51] Int. Cl.$^5$ .................................................. G01N 3/00
[52] U.S. Cl. ......................................... 73/808; 374/47
[58] Field of Search ..................... 73/788, 808, 813; 374/45–47, 49, 121, 124, 130, 141; 356/32; 250/316.1, 338.3, 358.1, 208.1

[56] References Cited

U.S. PATENT DOCUMENTS 4,378,701  4/1983  Mountain et al. ............... 73/808
4,541,059  9/1985  Toshihiko .

FOREIGN PATENT DOCUMENTS 153231  11/1981  Japan .
250532   3/1985  Japan .
 29735   6/1986  Japan .
 01156  12/1979  World Int. Prop. O. .

OTHER PUBLICATIONS

Optical Engineering, vol. 26, No. 1 (Jan. 1987).

Primary Examiner—Robert Raevis
Attorney, Agent, or Firm—Sughrue, Mion, Zinn, Macpeak and Seas

[57] ABSTRACT

Apparatus for measuring stress at a point on an object comprising: means for applying a cyclically varying load of period T to the object; detector means for collecting and measuring thermal radiation from said point over a sample time interval t, wherein t<T; means for determining the phase of the first interval t with respect to the cyclic variation of thermal radiation produced by said point in response to said applied load and, from said collected and measured value of thermal radiation and said phase, for providing a measure of stress at said point.

26 Claims, 5 Drawing Sheets

METHOD AND APPARATUS FOR DETECTING STRESS IN AN OBJECT

BACKGROUND OF THE INVENTION

The present invention relates to a method and apparatus for detecting stress in an object in response to an applied load. It is often desired to determine stress in an object to which a working load has been applied. For example, it is desirable to determine the effect of the application of working loads on automobile suspension parts to determine whether, in use, there will be concentrations of stress.

Many methods have been utilised in the past, including utilising transparent models of the component part, applying a working load, and from the polarisation effects, determining the stress across the object. With such an arrangement, apart from the fact that the object itself is not being tested, but a replica thereof, it can be difficult to determine whether tension or compression is present in a particular area of the object and difficult to quantitatively determine the stress.

Another conventional way of testing for stress is the use of stress gauges which are attached to particular parts of the object under test. Clearly the stress gauges can only test for stress between two particular points and there are a limited number of points which one can examine in this way. An unusual configuration of stress concentration might be missed by such a method.

SUMMARY OF THE INVENTION

According to one aspect, the present invention provides a method of measuring stress at a point on an object comprising:

determining a load applied to the object; collecting and measuring thermal radiation from said point over a plurality of sample time intervals t within a predetermined minimum period of interest T, wherein $t<T$;

and, from said collected and measured values of thermal radiation and said determined load providing a measure of stress at said point.

According to a second aspect, the present invention provides a method of measuring stress at a point on an object comprising:

applying a cyclically varying load of period T to the object;

collecting and measuring thermal radiation from said point over a sample time interval t, wherein $t<T$;

determining the phase of the first interval t with respect to the cyclic variation of thermal radiation produced by said point in response to said applied load;

and, from said collected and measured value of thermal radiation and said phase, providing a measure of stress at said point.

We may also compare the phase of the thermal radiation received from said point with the phase of the applied load to determine whether the application of load submits the object at said point to tension or compression.

Thus, the described embodiment of the invention is based on the Kelvin effect in which the application of a load to an object changes the temperature of that object.

Stress in the form of tension increases the temperature and stress in the form of compression decreases the temperature. This should be distinguished from the hysterisis effect.

In a typical example, the sample interval t can be 50 $\mu$s and the frequency of the cyclically varying load up to 10 kHz (i.e. $T=10^{-4}$ s). However we prefer the first predetermined interval t to be less than $T/4$ and even more preferably less than $T/8$.

We would normally determine the peak value of the cyclic thermal signal, i.e. determine the value of the cyclically varying thermal radiation from said point when the phase of t corresponds to the peak of the cyclic thermal signal. We can either measure the value of the cyclic thermal signal at its peak or we can extrapolate from other values if we know the phase of the measured value. Thus, for example, if we know that the cyclic thermal signal is sinusoidal and that t is displaced by a phase angle of A degrees from the peak value of the maximum thermal signal, then from the value measured during the interval t, we can calculate the maximum value which it would reach if $A=0$.

Alternatively, we can compare the value of the thermal signal at t with the instantaneous value of the applied load and assume that the thermal signal and the applied load are in phase.

However, in a preferred arrangement we build up the cyclically varying values of the cyclic thermal radiation collected and measured from the point on the object over a plurality of cycles (which may not necessarily be successive cycles) and from this we can extrapolate and determine accurately the peak values of the cyclic thermal radiation received and hence the peak values of stress at said point and can also determine the relative phase of the cycles of thermal radiation received and load applied.

In a more preferred arrangement we collect and measure thermal radiation from the point on the object for a plurality of sample periods t over a plurality of received thermal radiation cycles, arranging for the sample periods t to always be at the same point in phase with respect to the received thermal radiation cycles. In this way we can improve the signal to noise ratio. Furthermore, we can adjust the phase of sample period t so as to coincide with the peak value of the thermal radiation cycle.

In the above statements, we have described a method for measuring the stress at a point on an object. In a preferred arrangement, the method may simultaneously, or substantially simultaneously, measure the stress at a plurality of points across an object. In this case, the means for measuring the thermal radiation may comprise a detector array for simultaneously viewing a plurality of points on the object.

In a preferred arrangement we scan the point (or points) whose stress is to be measured across the surface of the object so as to build up a picture of the variation of stress across the object.

The present invention also provides apparatus for measuring stress at a point on an object comprising:

means for applying a cyclically varying load of period T to the object;

detector means for collecting and measuring thermal radiation from said point over a predetermined first interval t, wherein $t<T$;

means for determining the phase of the first interval t with respect to the cyclic variation of thermal radiation produced by said point in response to said applied load and, from said collected and measured value of thermal radiation and said phase, for providing a measure of stress at said point.

Means may be provided to display the measured stress in respect of a plurality of points across the object to provide a picture of the stress across said object.

The detector means may be a single detector means but is preferably an array of detectors and means may be provided to interrogate in sequence each of the detectors to determine the value of thermal radiation measured by each detector.

The or each detector may be of a type which has what is called a "stare" time, that is a time during which it receives radiation and builds up an electrical signal such as an electrical charge. Clearly in order to read the detector it is necessary to measure or remove the charge from the detector and a number of means for doing this will be described.

As already mentioned, in a particular preferred arrangement, the detector may comprise an array of detectors. Thus, for example, detectors such as semiconductor or pyroelectric detectors may be used which require discharge between each stare to measure the charge built up during the stare. Semiconductor detectors are available in for example, arrays of 512×512 or 1024×1024 detectors.

We will refer through the specification to optical system and optical components and lenses. It should be understood that these are infra red components as thermal radiation is utilised.

BRIEF DESCRIPTION OF THE DRAWINGS

Apparatus providing a preferred embodiment of the invention will now be described by way of example only and with reference to the accompanying drawings in which.

DETAILED DESCRIPTION OF THE PREFERRED EMBODIMENTS

Figure 1:
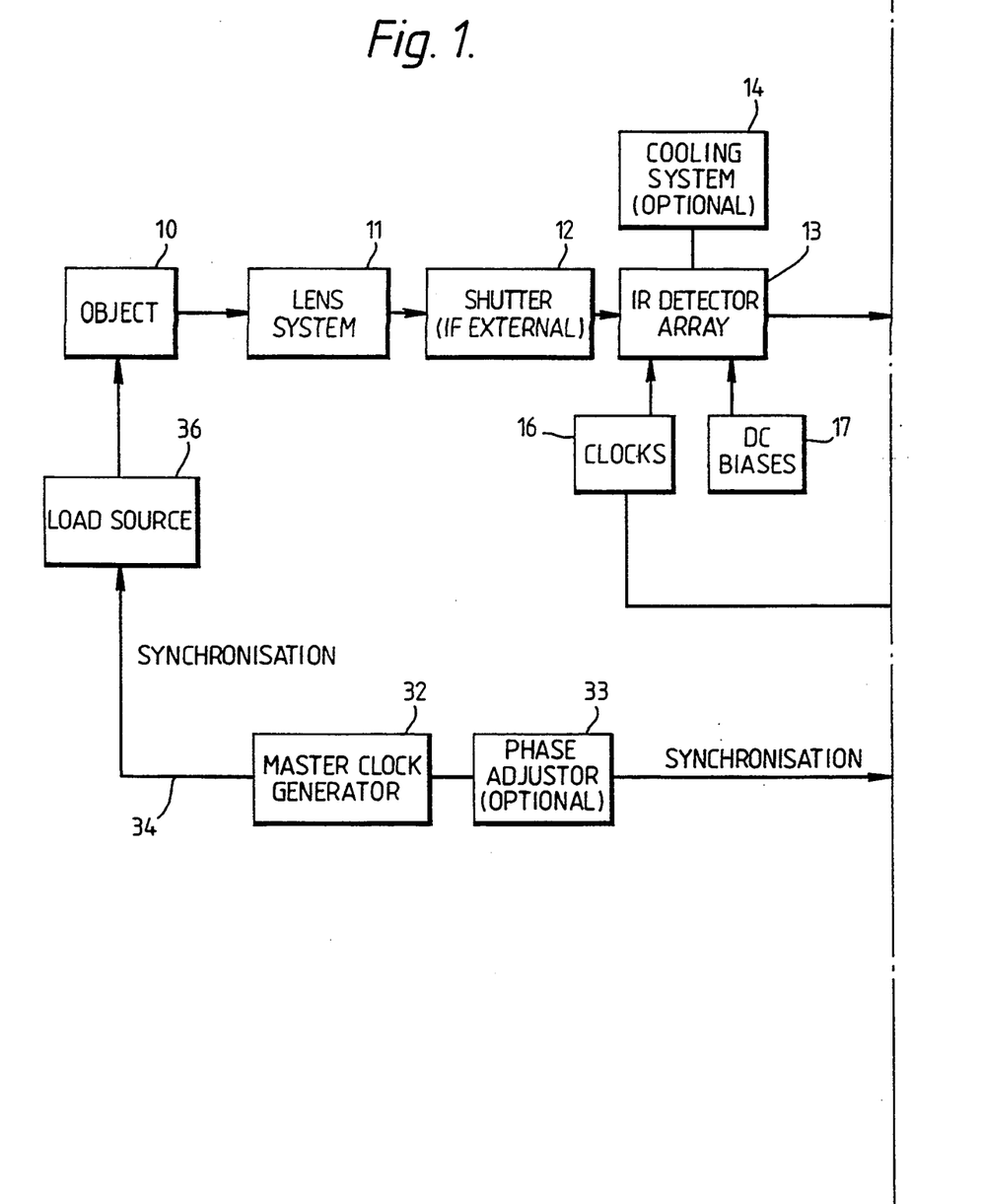
FIG. 1 is a diagram showing the parts of the apparatus and their connections.

Referring to FIG. 1 there is shown an object 10 which is to be examined, which may be, for example, any stressed component such as a turbine blade, or an automobile suspension part.

An image of the object 10 is collected by a lens system 11, which should include a spectral filter centred on the wavelength required to attenuate unwanted radiation, the image being passed via an optional shutter 12 onto an infra red detector array 13. The detector array may comprise either a linear or two dimensional array of detectors. It may be that in some circumstances there may be sufficient detectors in a two dimensional detector array 13 to continuously view all of the object 10 in real time. In those circumstances, each detector in the detector array will view a single point.

On the other hand, greater detail may be required or the detector array 13 may be, for example, a linear array and in that case, there may be provided a scanning means within the lens system 11. Thus, if the detector array is a linear array, then the scanning system may be arranged so as to scan the line of points which is viewed by the linear array across the object 10 in a series of swathes. If, however, the object 10 is small and the detector array 13 is a two dimensional array having many detectors, then no scanning need be carried out.

Examples of the kind of detector array 13 which may be used are an Insb Photo Diode of 128×128 detectors manufactured by Amber Engineering Inc of Santa Barbara, Calif., USA. In our preferred arrangement, however, the array may comprise a platinum silicide array of 1024×1024 detectors which has four outputs (one at each corner) and is read out at a detector rate of 10 MHz. To deal with load frequencies up to, for example, 10 KHz one needs a stare time (see later) of less than 50 µs for efficient observation with a minimum of background signal.

The infra red detector array 13 may in some cases be cooled and a cooling system may be provided for this. The cooling system may be for example, Joule-Thomson or a bulk liquid Dewar arrangement.

The infra red detector array 13 is controlled by means of clock signals from clocks 16 and DC biases from DC supplies 17.

The output signal from the infra red detector array 13 is passed through a preamplifier and analogue to digital converter 18, (one preamplifier for each of the outputs from the array 13) and the output signal from the preamplifier and ADC 18 (analog to digital converter) is passed to an add/subtract circuit 19. The output signal from the add/subtract circuit 19 is passed to an image accumulation RAM 21 (random access memory), there being provided a feed back loop 22 from the output of the RAM 21 to the add/subtract circuit, and the output signal of the image accumulation RAM 21 is otherwise passed through a gain corrector 23 to a video screen/memory 24. The video screen/memory may comprise a memory for the signals from the gain corrector 23 which may be played later to a video screen or may be provided direct to a video screen in real time. There is provided a data bus 26 to which may be connected peripherals 27 which may include printers, plotters and the like and a host processor 28.

There is provided a timing generator 31 controlled from a master clock generator 32, which provides timing signals, for inter alia, the output arrays 18, and the clocks 16. The master clock generator 32 passes an output signal to a phase adjustor 33. Thus the phase of clock signals passing from the phase adjustor 33 to the timing generator 31 may be varied with respect to the timing signals produced on the output 34 of the clock generator 32. The output 34 of the clock generator 32 is connected to a load source 36 which comprises means for applying a cyclic load to the object 10. This may be in the form of, for example, a hydraulic or pneumatic ram.

Figure 3:
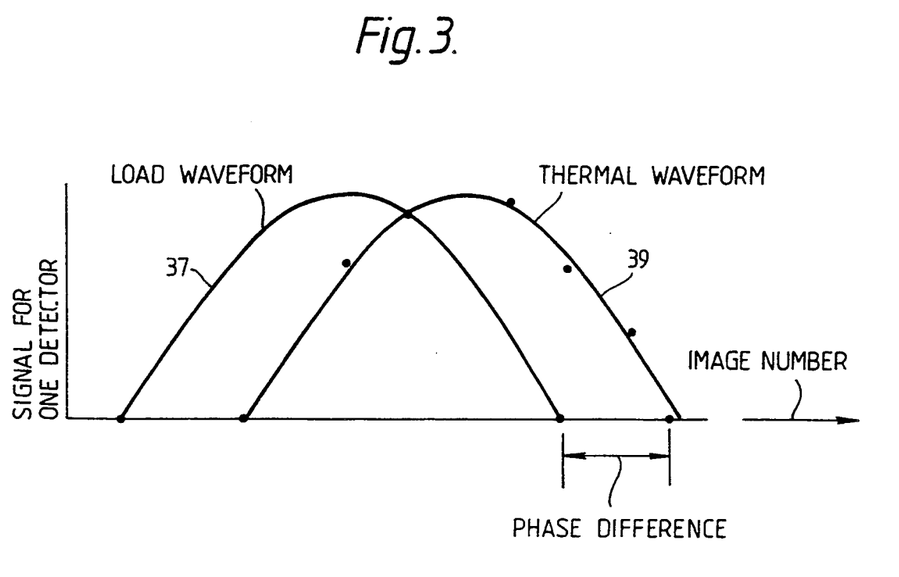
FIG. 3 shows part of two waveforms and their phase differences.

Thus, for example, if the object 10 is a turbine blade, then the load source 36 may apply a cyclically varying transverse load to the tip of the turbine blade. The waveform of the load source is shown in FIG. 3 at 37.

Instead of the clock generator 32 effectively controlling the load source 36, which may sometimes be difficult in practice, the relevant clock signals for operating the system may effectively be derived from the output of the load source 36.

Figures 5, 6:
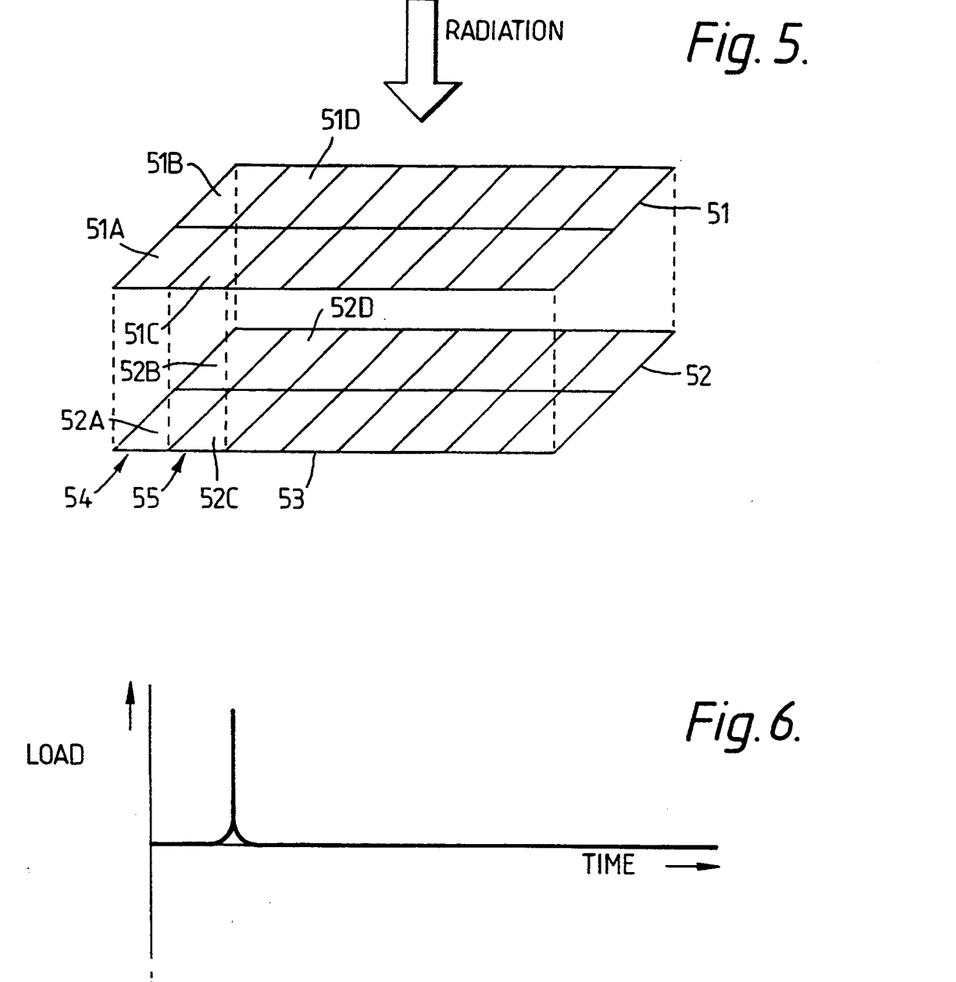
FIG. 5 is a diagram of the form of the detectors of the detector array.
FIG. 6 is a diagram of an alternative applied load, and, FIG. 7 is a diagram showing the waveform of the thermal signal received from a point on the object loaded in accordance with the load of FIG. 6.

We now refer in more detail to the infra red detector array 13. This may comprise an integrated semiconductor circuit device illustrated in FIG. 5 in diagrammatic form. Thus, radiation falls on the upper surface 51 of the detector array, the upper surface being divided into a multiplicity of detector elements 51A, 51B etc. Each segment of the upper layer 51 is connected to a corresponding segment 52A, 52B of lower layer 52. Although of course FIG. 5 is diagrammatic, in practice in many circumstances the integrated semiconductor circuit device, instead of having the detector elements 51A, 51B and the segments 52A, 52B in separate layers, is normally arranged with the detector elements 51A, 51B . . . and the segments 52A, 52B . . . being arranged side by side on a single layer.

Output means 53 may be provided down one edge of the layer 51.

Thus, as radiation falls onto the detector surfaces 51A, 51B, charge is built up (integrated) on each detector dependent upon the amount of radiation reaching the detector. This charge is stored. The charge is allowed to build up for a period of time t which is referred to as the state time. This stare time may be defined electronically by an electrical signal being passed to circuits controlling the detectors 51A, 51B etc or may be defined by the shutter 12.

At the end of the stare time t, the detectors 51A, B . . . are switched off and so are no longer sensitive to radiation. The charge on each detector 51A, B . . . is then transferred to its respective segment 52A, B . . . In this way the detectors are discharged and they may then be allowed to receive more radiation.

In the meantime the charge, or a signal relating to that charge, has to be outputted from the segments 52A, B. This is done by the output means 53, electronics within the circuit moving the charge or signal from each segment 52A, B, in a single column 54 successively to the output means 53, and when all of the segments 52A, B, in column 54 have been moved by the output means, the output means then interrogates and removes the output signals from segments 52C, 52D in the next column 55. This movement of the charge along the columns is controlled by the clock signals from the clocks 16.

In practice the time to remove the charge or signals from the output means 53 may be greater than the stare time for the detectors and so the detectors are not operational to receive radiation at all times.

In use, therefore, the object 10 is loaded cyclically by the load source 36, the load source itself being operated in synchronism with the master clock generator 32. A point or points across the object 10 are viewed via the lens system and shutter 12 by the detector array 13. The output signal from the detector array (as produced by the output means 53) is amplified in a preamplifier 18 and changed from an analog to a digital signal. The amplified digital signal is passed to the add/subtract circuit 19. As the output signal can go effectively +or −depending on whether the temperature of the point has increased or decreased, the add/subtract circuit can be used to invert the value of, for example, the negative signals so as to provide positive signals only.

Generally, the data at this point could be multiplied by the cosine of the phase angle. The add/subtract circuit could be implemented in electronic hardware or using a digital signal processing (DSP) integrated circuit, (for example Analog Device ADSP 2100).

The output of the circuit 19 can be accumulated in an image accumulator. Obviously some detectors 51A, 52B will be more sensitive than others and the gain corrector 23 can be provided to correct for this variation of sensitivity of the detectors. The signal can then be passed to a video screen for viewing.

Figure 2:
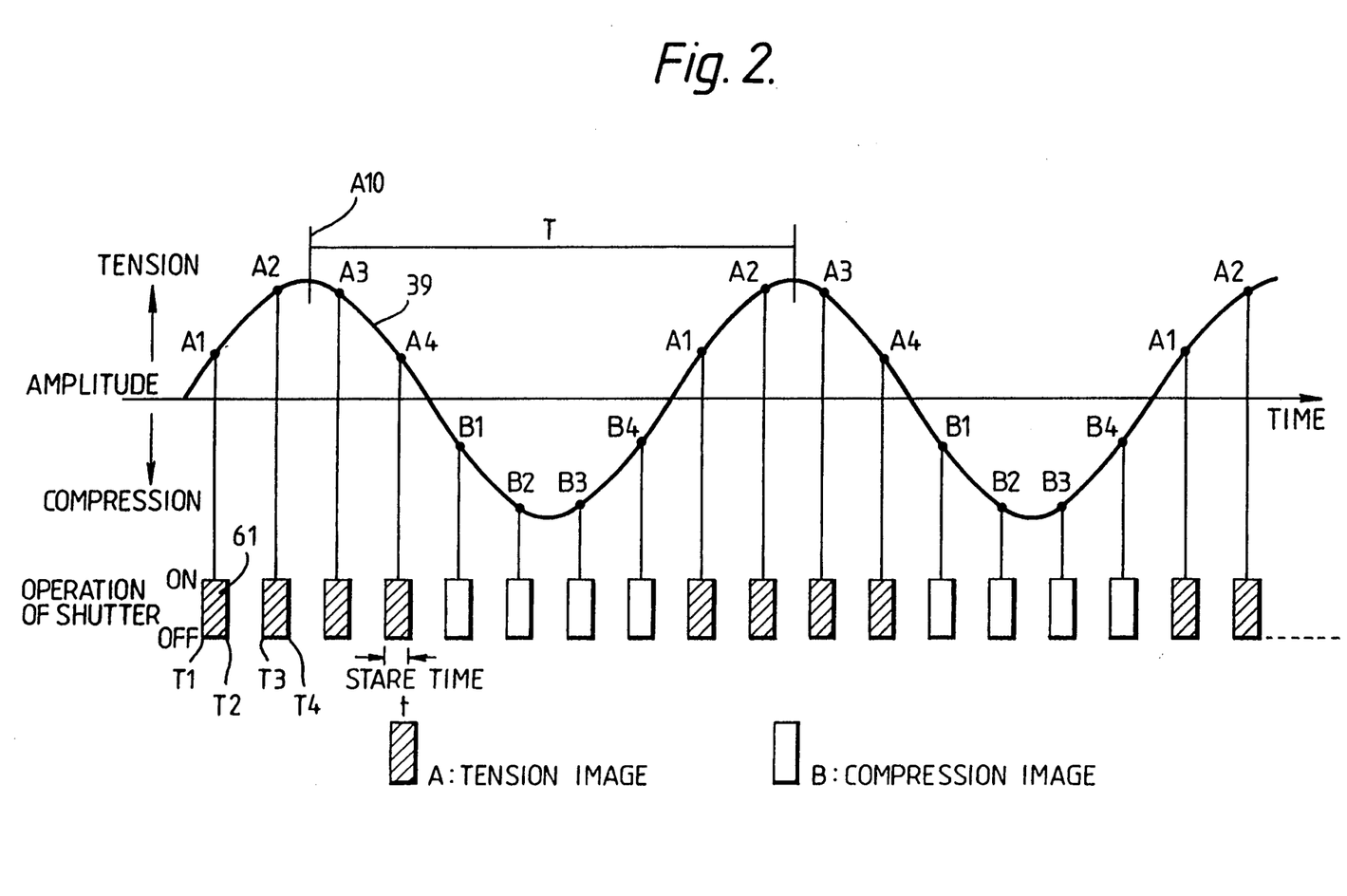
FIG. 2 shows a signal waveform and the manner in which the apparatus of FIG. 1 operates.

Referring now to FIG. 2 there is shown the waveform 39 of the thermal signal received from a single point on the object 10 by a detector in the array 13. As can be seen, in response to the sinusoidal cyclic variation of load from the load source 36, the thermal signal 30 is cyclical. However, referring to FIG. 3 it will be seen that it may well be the load waveform 37 provided by the load source 36 is out of phase with respect to the thermal waveform 39 (i.e. the phase angle is not zero).

Referring back to FIG. 2, the thermal waveform 39 can be reproduced by a particular detector 51. Thus, at point T1 along the cycle, the detector 51 is switched on and begins to load charge in response to the amount of thermal radiation striking the detector from the point of the object under test. At point T2, which is a period of time t after T1 the detector is switched off. This period of time is indicated by the box 61. At T3, when the detector has been cleared the detector is switched on again for a further period of time t (i.e. until T4).

By successively repeating the process, providing t is much less than T, that is the period of the thermal waveform, then the waveform can be built up. Clearly, the accuracy of the thermal signal adjacent the origin O in FIG. 2 is not very great and so the accuracy increases as one gets to the peak of the thermal signal and by measuring the thermal signal at a plurality of points along the cycle one can accurately determine (in the host processor 28) the peak value of the thermal signal at A10.

Alternatively, as the charge applied to the detector during the short stare time t will be small, it is desirable to add the charge for a plurality of stare times. This can be done by holding the charge on the detector and loading the charge onto the detector over several thermal cycles. If the successive short stare times t are at the same point in successive thermal cycles (for example A1, A1, A1 in FIG. 2) then we will effectively improve the signal-to-noise ratio in respect of the point A1 and will retain the phase information. In other words, we can collect for several successive stare times over several cycles at the point A1, and then switch to collecting several stare times from point A2 and so on.

However it may be that we will lose phase information (i.e. we will not know whereabouts on the thermal cycle the particular stare time t is). We can, however, regain the phase information in a variety of ways. We can determine the phase from instantaneous signals from adjacent detectors (i.e. not all detectors being arranged to accumulate the charge), or we can extrapolate the phase from the same detector at adjacent periods of time (so that the detector can be switched back and forth between an accumulation state and a second state in which it only produces a real-time signal, the phase from the second state being extrapolated through the accumulated state). Alternatively, we can move the stare times so that they coincide with the peak value of the thermal cycle. This can be done by adjusting the phase of the shutter 12 or the clocks 16 with respect to the phase of the signal passed to the load source 36. This phase adjustment is carried out by the phase adjustor 33. In this way we can improve the signal to noise ratio by (a) collecting the charge on the detector over several cycles and (b) adjusting the phase of the stare time so that it coincides with the peak of the thermal cycle.

Figure 4:
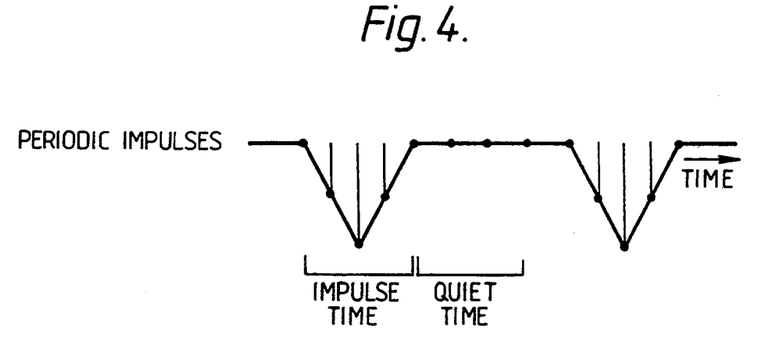
FIG. 4 shows an alternative loading cycles.

FIG. 4 shows another form of cyclic loading.

Figure 7:
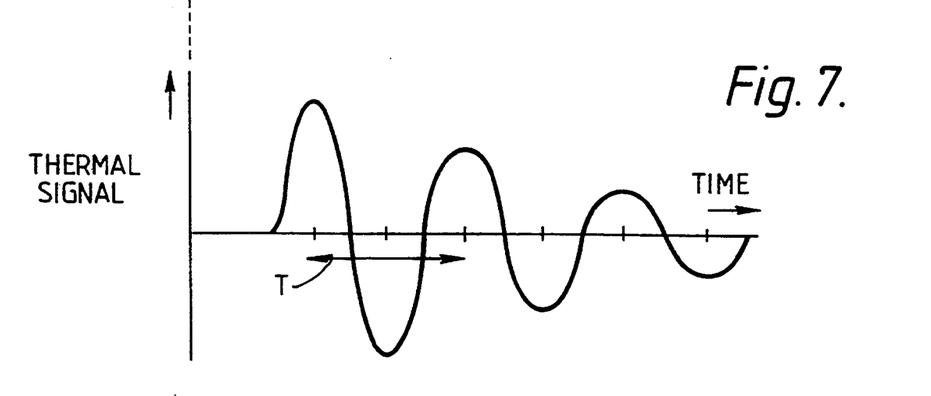

Referring now to FIGS. 6 and 7 it will be seen from FIG. 6 that an instantaneous load may be applied to the object 10. This may be applied, for example, by means of a hammer blow. The effect of such a hammer blow will be to produce a thermal signal of the type shown in FIG. 7 at a particular point. The waveform of FIG. 7 is a decreasing sinusoid. In order to analyse the signal of FIG. 7 with the apparatus of the invention, it is necessary to set the stare time t<T where T is as shown on FIG. 7 the minimum period of interest which may be, for example, a single cycle of the sinusoid. However, of course, the waveform of FIG. 7 may be other forms than a declining sinusoid and the period T may be suitably defined.

Because of the time taken to download a large number of detectors (for example in a 1024×1024 array) the downloading time can be quite long. It may be arranged such that groups of detectors may be downloaded simultaneously to reduce the downloading time. This can be done when the resolution required is not as great as in other circumstances.

We now refer to some of the components in more detail.

Thus, the add/subtract circuit 19 either adds or subtracts, depending on control signals from the timing generator, the digitised signal from each detector in the array to the previous signal value for that detector stored in the accumulation memory 21. Whether these signals are added or subtracted depends on the phase of the load waveform at the time the signals were obtained. Signals corresponding to compressive loads (e.g. A in FIG. 2) can be added and signals taken when the object is under tension (e.g. B in FIG. 2) can be subtracted.

The signals are accumulated over a period of time until the required signal to noise ratio is achieved. The addition of signals in the accumulation memory 21 increases the signal to noise ratio and differencing of tension and compression signals removes background signals arising from causes other than the thermoelastic (Kelvin) effect (e.g.; hysteresis, which causes a slow increase in temperature; inherent differences in the ambient temperature of different points of the object; and variation in the basic signal produced by each detector in the array etc).

The output signal from the add/subtract circuit is accumulated in the random access memory (RAM) 21. The size of the memory must be at least N×D×P bits where P is the number of detectors required in the image (which can be less than the number of detectors in the array 13, as will be clear later)

D is the number of quantisation bits used in the analogue to digital conversion (i.e. each signal value is digitised to up to $2^D$ levels)

N is the number of separate images required, and N>1 if phase information is required.

The data can be stored in the RAM 21 in fixed or floating point format, but the depth of the memory must be such that there is no overflow when images are accumulated.

The gain correction circuit 23 includes memory means to store the gain correction factors for each detector in the array. The gain correction factors are stored in a table by a calibration routine which gathers data from flat field images. The gain correction in the present instance is, of course, digital, but if required the gain corrector 23 could be provided between the infra red detector 13 and analogue to digital converter 18 in which case the gain corrector would be an analogue gain corrector.

The data in the accumulation memory 21 (connected to a gain correction circuit 23) has to be displayed and/or analyzed and/or stored. Thus each image from the accumulation memory (that is output signals relating to each of the detectors in the detector array) in one use is loaded into the dual-ported video screen memory 24 which is accessible by the host processor 28. A refresh rate of one frame every two seconds allows the gradual improvement in signal to noise ratio to be observed in real time and observations can be stopped when the required level is reached. The host processor 28 can also be used to programme the timing generator 31 for different modes of operation, for example, modes having different numbers of image samples per load cycle.

The invention is not restricted to the details of the foregoing examples, for example, the detector array 13, may comprise a Loral-Fairchild 244×190 platinum silicide (PtSi) array cooled to near 77° K. and operated at 25 Hz frame rate with a 100% duty cycle (that is readout time=stare time). The interrogation rate would be approximately 0.9 μs per detector and a 12 bit dual flash ADC (e.g. DATEL ADC 500) is used. The accumulation memory 21 comprises a 64K×4 or even 1M×1 dynamic RAM. For a 24 bit depth, 6 off 64K×4 DRAM chips are needed.

With some types of photodetector array it is possible to control the time for which the individual detectors can collect and store charge generated by the incoming radiation separately from the registers which transfer the charge to each output node. With other types of array this may not be convenient or possible. For example in a charge-coupled device (CCD) the detectors may themselves be part of the shift registers. It may sometimes be desirable to have a very short stare time (i.e. shorter than the time to readout all the charge for every detector in the array) so that high frequency changes can be efficiently detected.

In many instances it is desirable to reduce the readout time and the stare time which allows one to deal with higher frequencies. Techniques which may be used include 1) The stare time can be shortened by clocking the array backwards (i.e. in the opposite direction from that used normally to transfer charge to output node) and to dump charge in a drain structure (sometimes termed an anti-blooming drain). The image area is reverse clocked for part of the time and clocked normally for the remainder.

2) The total readout time may be shortened by performing a slow readout of regions of interest in the image and a fast dumping of charge for unwanted portions of the image.

3) With a CCD, detector signals can be binned together on chip by not always resetting the output node once per detector. This, in effect, creates a lower resolution image with fewer picture elements.

4) With a detector array which can be randomly addressed (e.g. a charge injection device or CID) then only the detectors of interest need be readout.

As already described it is desirable also that the detectors in some circumstances may accumulate charge from several short stares to improve the signal to noise ratio. Various ways can be arranged to deal with this, depending on the architecture of the infra red array used such as i) If the photodetectors are connected to the readout section (which can be a CCD) by a transfer gate then the gate can be repeatedly operated so as to transfer charge from the detector element, but if the readout is temporarily suppressed then signals can accumulate in the readout structure until the desired level is reached and the readout is commenced.

ii) It may be possible to shift the signal charge from the detector elements to an area or areas which are shielded from incoming radiation (e.g. CCD readout registers or storage regions) and then back again to the detector element to accumulate charge from a further stare and so on repeatedly until the desired charge level is achieved and the array is readout.

We claim:

1. A method of measuring stress simultaneously at a plurality of points on an object, comprising the steps of: applying a cyclically varying load of period T to the object, collecting and measuring thermal radiation from a plurality of said points over a sample time interval t, wherein $t<T$, determining the phase of the first sample time interval t with respect to the cyclic variation of thermal radiation produced by each point in response to said applied load, and, from said collected and measured value of thermal radiation and said phase, providing a measure of stress at each point.

2. A method as claimed in claim 1, wherein the phase of the thermal radiation received from each said point is compared with the phase of the applied load to determine whether the application of the load submits the object at each said point to tension or compression.

3. A method as claimed in claim 1, wherein the first sample interval t is approximately 50 $\mu$s.

4. A method as claimed in claim 1, wherein the frequency of the cyclically varying load is up to 10 kHz.

5. A method as claimed in claim 1, wherein the sample interval t is less than T/4.

6. A method as claimed in claim 1, wherein the cyclically varying values of the cyclic thermal radiation are generated by collecting and measuring radiation from each point on the object over a plurality of cycles and extrapolating to determine the peak values of the cyclic thermal radiation received and hence the peak values of stress at each said point.

7. A method as claimed in claim 1, wherein thermal radiation from each point on the object is collected and measured for a plurality of sample periods t over a plurality of received thermal radiation cycles, the sample periods 't' always being at the same point in phase with respect to the received thermal radiation cycles whereby to improve the signal to noise ratio.

8. A method as claimed in claim 7, wherein the phase of sample period t is adjusted so as to coincide with the peak value of the thermal radiation cycle.

9. A method as claimed in claim 1, wherein a detector array is used to simultaneously view a plurality of points on the object.

10. A method as claimed in claim 1, wherein said points whose stress is to be measured are scanned across the surface of the object so as to build up a picture of the variation of stress across the object.

11. A method of measuring stress simultaneously at a plurality of points on an object, comprising the steps of: applying a cyclically varying load of period T to the object, collecting and measuring thermal radiation from a plurality of said points over a plurality of sample time intervals t, wherein $t<T$, and, from said collected and measured values of thermal radiation determining the peak thermal radiation, and from said peak radiation and from said cyclically varying load, providing a measure of stress at each point.

12. A method as claimed in claim 11, wherein the phase of the thermal radiation received from each said point is compared with the phase of the applied load to determine whether the application of the load submits the object at each said point to tension or compression.

13. A method as claimed in claim 11, wherein the frequency of the cyclically varying load is up to 10 kHz.

14. A method as claimed in claim 11, wherein the sample interval t is less than T/4.

15. A method as claimed in claim 11, wherein the cyclically varying values of the cyclic thermal radiation are generated by collecting and measuring radiation from each said point on the object over a plurality of cycles, and extrapolating to determine the peak values of the cyclic thermal radiation received and hence the peak values of stress at each said point.

16. A method as claimed in claim 11, wherein thermal radiation from each said point on the object is collected and measured for a plurality of sample periods t over a plurality of received thermal radiation cycles, the sample periods "t" always being at the same point in phase with respect to the received thermal radiation cycles to thereby improve the signal to noise ratio.

17. A method as claimed in claim 16, wherein the phase of sample period t is adjusted so as to coincide with the peak value of the thermal radiation cycle.

18. A method as claimed in claim 11, wherein a detector array is used to simultaneously view a plurality of points on the object.

19. A method as claimed in claim 11, wherein said points whose stress is to be measured are scanned across the surface of the object so as to build up a picture of the variation of stress across the object.

20. A method as claimed in claim 11, wherein the first sample interval t is approximately 50 $\mu$s.

21. An apparatus for measuring stress simultaneously at a plurality of points on an object, comprising: means for applying a cyclically varying load of period T to the object, detector means for collecting and measuring thermal radiation from said plurality of points over a sample time interval t, wherein $t<T$, means for determining the phase of the sample time interval t with respect to the cyclic variation of thermal radiation produced by said points in relation to said applied load, and, from said collected and measured value of thermal radiation and said phase, providing a measure of stress at said points, said detector means comprising an array of detectors, and means for interrogating in sequence each of the detectors to determine the value of thermal radiation measured by each detector.

22. An apparatus as claimed in claim 21, further comprising means (24) to display the measured stress in respect of a plurality of points across the object (10) to provide a picture of the stress across said object (10).

23. An apparatus as claimed in claim 21, wherein the detectors have a stare time comprising said sample time interval t, during which they receive radiation and build up an electrical charge, and means is provided to measure or remove the charge from the detector.

24. An apparatus for measuring stress simultaneously at a plurality of points on an object, comprising: means for applying a cyclically varying load of period T to the object, detector means for collecting and measuring thermal radiation from said points over a plurality of sample time intervals t, wherein $t<T$, and, from said collected and measured values of thermal radiation, determining the peak thermal radiation, and from said peak thermal radiation and said load, providing a measure of stress at each said point, said detector means comprising an array of detectors, and means for interrogating in sequence each of the detectors to determine the value of thermal radiation measured by each detector.

25. An apparatus as claimed in claim 24, further comprising means to display the measured stress in respect of a plurality of points across the object to provide a picture of the stress across that object.

26. An apparatus as claimed in claim 24, wherein the detectors have a stare time comprising said sample time interval t, during which they receive radiation and build up on electrical charge, and further comprising means for measuring or removing the charge from the detector.

* * * * *